| (12) | United States Patent<br>De Courville et al. | (10) Patent No.: US 7,719,955 B2<br>(45) Date of Patent: May 18, 2010 |
|---|---|---|

(54) TRANSMISSION OF SIGNALING INFORMATION IN AN OFDM COMMUNICATION SYSTEM

(75) Inventors: Marc Bernard De Courville, Paris (FR); Stephanie Rouquette-Leveil, Massy (FR); Patrick Labbe, Antony (FR); Markus D. Muck, Paris (FR); Sebastien Simoens, Sceaux (FR)

(73) Assignee: Motorola, Inc., Schaumburg, IL (US)

( * ) Notice: Subject to any disclaimer, the term of this patent is extended or adjusted under 35 U.S.C. 154(b) by 263 days.

(21) Appl. No.: 11/912,623

(22) PCT Filed: May 1, 2006

(86) PCT No.: PCT/US2006/016567

§ 371 (c)(1),
(2), (4) Date: Oct. 25, 2007

(87) PCT Pub. No.: WO2006/119159

PCT Pub. Date: Nov. 9, 2006

(65) Prior Publication Data

US 2009/0129258 A1 May 21, 2009

(30) Foreign Application Priority Data

May 3, 2005 (GB) .................................. 0508797.8

(51) Int. Cl.
*H04J 11/00* (2006.01)
*H04J 1/00* (2006.01)
*H04L 27/00* (2006.01)
(52) U.S. Cl. ........................ 370/203; 370/343; 370/480; 375/295
(58) Field of Classification Search .................. None
See application file for complete search history.

(56) References Cited

U.S. PATENT DOCUMENTS 6,553,011 B1    4/2003  Yan et al.

(Continued)

FOREIGN PATENT DOCUMENTS

EP          1526674 A1    4/2005

(Continued)

OTHER PUBLICATIONS

C. Kose, et al., "WWiSE Proposal: High Throughput Extension to 802.11 Standard, Section 20.3.4 Signal Fields (SIG-N and SIG-MM)," IEEE P802.11 Wireless LANs, Mar. 18, 2005, pp. 1, 69-71.

(Continued)

*Primary Examiner*—Kevin C Harper
*Assistant Examiner*—Xavier Szewai Wong

(57) ABSTRACT

An Orthogonal Frequency Division Multiplexing, OFDM, transmitter comprises a signalling data generator (113) which generates a set of data symbols indicative of physical layer characteristics of data transmissions from the OFDM transmitter (100). A first symbol generator (115) and second symbol generator (117) generates a first and second OFDM signalling symbol by allocating the set of data symbols to subcarriers. The allocation of the physical layer data symbols to subcarriers is different for the first OFDM signalling symbol and the second OFDM signalling symbol. A data packet generator (105) and transmitter (101) generate a data packet and transmit this to an OFDM receiver (300). The OFDM receiver (300) determines the physical layer data symbols by combining the data symbols of corresponding subcarriers of the first and second OFDM signalling symbols and uses the resulting information to decode the user data of the data packet.

9 Claims, 6 Drawing Sheets

U.S. PATENT DOCUMENTS

| | | | |
|---|---|---|---|
| 6,847,805 B2 | 1/2005 | Liu | |
| 6,956,842 B1 | 10/2005 | Okumura et al. | |
| 7,486,751 B1 * | 2/2009 | Pare et al. | 375/347 |
| 2005/0035885 A1 | 2/2005 | Hosur et al. | |
| 2005/0084035 A1 | 4/2005 | Kim et al. | |
| 2005/0237989 A1 * | 10/2005 | Ahn et al. | 370/343 |
| 2006/0104196 A1 * | 5/2006 | Wu et al. | 370/208 |
| 2006/0120273 A1 * | 6/2006 | Wang et al. | 370/208 |
| 2006/0133538 A1 * | 6/2006 | Stojanovic et al. | 375/308 |
| 2006/0193391 A1 * | 8/2006 | Borran et al. | 375/260 |

FOREIGN PATENT DOCUMENTS

| | | |
|---|---|---|
| GB | 2 425 922 A1 | 8/2006 |
| KR | 2001-9619 A | 2/2001 |
| KR | 2001-71793 A | 7/2001 |
| KR | 2003-78658 A | 10/2003 |
| KR | 2005-23806 A | 3/2005 |
| WO | WO2005069573 A1 | 7/2005 |

OTHER PUBLICATIONS

Translation of Korean Office Action issued Nov. 21, 2008.

Steven Blount, "PCT/US2006/016567—PCT International Search Report and Written Opinion," WIPO, ISA/US, Commissioner for Patents, Alexandria, VA, USA, Apr. 9, 2007.

Dorothee Mulhausen, "PCT/US2006/016567—PCT International Preliminary Report on Patentability," The International Bureau of WIPO, Geneva, Switzerland, Nov. 15, 2007.

* cited by examiner

TRANSMISSION OF SIGNALING INFORMATION IN AN OFDM COMMUNICATION SYSTEM

FIELD OF THE INVENTION

The invention relates to communication of signalling information in an OFDM communication system and in particular, but not exclusively to communication of signalling information related to physical layer characteristics in an IEEE 802.11 communication system.

BACKGROUND OF THE INVENTION

In recent years, wireless data communication in domestic and enterprise environments have become increasingly commonplace and an increasing number of wireless communication systems have been designed and deployed. In particular, the use of wireless networking has become prevalent and wireless network standards such as IEEE 801.11a and IEEE 801.11g have become commonplace.

The requirement for increasing data rates, communication capacity and quality of services has led to continued research and new techniques and standards being developed for wireless networking. One such standard is the IEEE 801.11n standard which is currently under development. IEEE 801.11n is expected to operate in the 2.4 GHz or 5 GHz frequency spectrum and promises data rates of around 100 Mbps and above on top of the MAC layer. IEEE 801.11n will use many techniques which are similar to the earlier developed IEEE 801.11a and IEEE 801.11g standards. The standard is to a large extent compatible with many of the characteristics of the earlier standards thereby allowing reuse of techniques and circuitry developed for these. For example, as in the previous standards IEEE 801.11a and IEEE 801.11g, IEEE 801.11n will use Orthogonal Frequency Division Multiplex (OFDM) modulation for transmission over the air interface.

Furthermore, in order to improve efficiency and to achieve the high data rates, IEEE 801.11n is planned to introduce a number of advanced techniques. For example, IEEE 801.11n communication is expected to typically be based on a plurality of transmit and receive antennas. Furthermore, rather than merely providing diversity from spatially separated transmit antennas, IEEE 801.11n will utilise transmitters having at least partially separate transmit circuitry for each antenna thus allowing different sub-signals to be transmitted from each of the antennas. The receivers may receive signals from a plurality of receive antennas and may perform a joint detection taking into account the number and individual characteristics associated with each of the plurality of transmit antennas and receive antennas. Specifically, IEEE 801.11n has seen the likely introduction of a Multiple-Transmit-Multiple-Receive (MTMR) antenna concept which exploits Multiple-Input-Multiple-Output (MIMO) channel properties to improve performance and throughput.

In order to enable or facilitate reception, the standards of IEEE 802.11a/g as well as all 802.11n proposals prescribe that all data packet are preceded by a physical layer preamble which comprise known data that facilitates receiver gain setting, synchronization and channel estimation. In addition, a dedicated OFDM symbol is included which conveys physical layer signaling required for the decoding of the data packet. This information includes, among others, information of the modulation scheme, coding rate and packet length for the data packet. This signaling is known as the SIG field. Since IEEE 802.11n receivers require information relating to multiple antennas, the signaling field has been enhanced for IEEE 802.11n and is generally referred to as SIG-N. The SIG-N fields are communicated as QPSK symbols in the subcarriers of the dedicated SIG-N field OFDM symbol.

Specifically, SIG-N mapping (QPSK) has been defined in the context of a proposal (Cenk Kose, Bruce Edwards, "WWiSE Proposal: High throughput extension to the 802.11 Standard", IEEE document number 11-05-0149-02-000n) to IEEE802.11n.

In such systems, no signaling information is available prior to the transmission of the SIG-N field and the receiver must thus be able to decode this field without any prior information about its nature (this is necessary for compatibility reasons).

In addition to providing high data rate services, IEEE 802.11n is also expected to be used for a variety of applications having different requirements and characteristics. For example, IEEE 802.11n may be used for lower data rate applications, such as mobile Voice over Internet Protocol (VoIP) and mobile multimedia streaming for handheld devices. Although these applications have low data rate it is desired that they can be accessed over a large area and therefore it is desirable for IEEE 802.11n cells to have as large a coverage area as possible.

In order to extend the range of IEEE 802.11n cells, low data rate robust modes have been proposed which exploit the potential of the MIMO configuration to increase range.

Some of the proposed modes use a Space Time Block Code (STBC) combined with the low order constellation BPSK (Binary Phase Shift Keying) to provide a robust communication at lower signal to noise ratios. In other proposals, range extension is achieved by efficient use of beamforming techniques.

However, a problem for these robust modes is that the range extension applied to the user data may result in a range which exceeds that achieved for the OFDM symbols containing the SIG-N fields. In order to overcome this discrepancy, it has been proposed to introduce an optional simple repetition of the SIG-N field such that the OFDM symbol is transmitted twice.

This approach may provide a 3 dB signal to noise ratio improvement and may thereby increase the range. However, although this extension is beneficial it is not optimal and may in some situations limit the effective coverage area of the IEEE 802.11n cell.

Hence, an improved OFDM communication system would be advantageous and in particular a system allowing increased range, improved compatibility between user data and signalling transmissions, low complexity and/or improved performance would be advantageous.

SUMMARY OF THE INVENTION

Accordingly, the Invention seeks to preferably mitigate, alleviate or eliminate one or more of the above mentioned disadvantages singly or in any combination.

According to a first aspect of the invention there is provided an Orthogonal Frequency Division Multiplexing, OFDM, transmitter comprising: means for generating a set of data symbols indicative of physical layer characteristics of data transmissions from the OFDM transmitter; first symbol generating means for generating a first OFDM signalling symbol by allocating the set of data symbols to subcarriers of the first OFDM signalling symbol; second symbol generating means for generating a second OFDM signalling symbol by allocating the set of data symbols to subcarriers of the second OFDM signalling symbol, the allocation of the set of data symbols to subcarriers being different for the first OFDM signalling symbol and the second OFDM signalling symbol; and transmitter means for transmitting a message comprising the first OFDM signalling symbol and the second OFDM signalling symbol.

The invention may allow an improved communication of physical layer characteristics data. An increased range may be obtained e.g. allowing improved cell coverage. In particular, frequency diversity may be exploited to allow transmission of signalling information over larger distances and/or with improved reliability. Specifically, in many communication systems, an improved correspondence between the range provided by signalling information and by user data may be achieved.

Specifically, the second symbol generating means provides a different allocation of the set of data symbols to subcarriers than the allocation of the set of data symbols to subcarriers by the first symbol generating means. Thus, the allocation of the set of data symbols to subcarriers is different for the first OFDM signalling symbol and the second OFDM signalling symbol.

According to an optional feature of the invention, the first symbol generating means is arranged to allocate a first subset of the set of data symbols to a first subset of subcarriers of the first OFDM signalling symbol and the second symbol generating means is arranged to allocate the first subset of the set of data symbols to a second subset of subcarriers. This may allow low complexity and improved performance and in particular may allow an efficient exploitation of frequency diversity. The first and second subsets of subcarriers are non-identical subsets of subcarriers.

According to an optional feature of the invention, the first symbol generating means is arranged to allocate a second subset of the set of data symbols to the second subset of subcarriers of the first OFDM signalling symbol and the second symbol generating means is arranged to allocate the second subset of the set of data symbols to the first subset of carriers. This may allow low complexity and/or improved performance.

According to an optional feature of the invention, the first and second subset of subcarriers are non-overlapping. None of the subcarriers of the first subset of subcarriers are included in the second set of subcarriers. This may allow improved performance and may in particular improve the frequency diversity.

According to an optional feature of the invention, the second symbol generating means is arranged to allocate the first subset of data symbols to subcarriers having a predetermined offset relative the first subset of carriers. This may allow low complexity and/or efficient performance.

According to an optional feature of the invention, the second symbol generating means is arranged to allocate data symbols to a subcarriers such that a data symbol of the first subset of data symbols allocated to subcarrier n by the first symbol generating means is allocated to subcarrier number n+N, where N is a predetermined integer. This may allow low complexity and/or efficient performance.

According to an optional feature of the invention, the first symbol generating means is arranged to include an indication of the presence of the second OFDM signalling symbol in the first OFDM signalling symbol. This may allow an efficient performance and/or may improve backwards compatibility and/or may facilitate communication in communication systems employing receivers and/or transmitters with differing capabilities.

According to an optional feature of the invention, the message comprises OFDM user data symbols and the set of data symbols are indicative of physical layer transmit characteristics for the OFDM user data symbols. This may provide high performance and/or may facilitate implementation.

According to an optional feature of the invention, the transmitter means is arranged to transmit the message on a plurality of transmit antennas. This may improve performance. In particular the first and second OFDM symbols may be transmitted using a Space Time Code such as an Alamouti code or using a beamforming approach.

According to an optional feature of the invention, the first symbol generating means is arranged to include an indication of the allocation of data symbols to subcarriers in the first OFDM signalling symbol.

This may improve performance and/or reduce complexity. The allocation may correspond to the allocation of the first OFDM signalling symbol and/or the second OFDM signalling symbol.

According to an optional feature of the invention, the OFDM transmitter is an Institute of Electrical and Electronics Engineers, IEEE, 802.11 transmitter. The transmitter may in particular be an IEEE 802.11a, IEEE 802.11g or IEEE 802.11n transmitter. The invention may provide particularly advantageous performance in an IEEE 802.11 communication system and may be compatible with standards and proposals for these systems. In particular, for IEEE 802.11n systems, the range for signalling information may be effectively increased thereby providing an improved correspondence to achievable ranges for user data.

According to a second aspect of the invention, there is provided an Orthogonal Frequency Division Multiplexing, OFDM, receiver for receiving signals from an OFDM transmitter, the OFDM receiver comprising: means for receiving a message comprising a first OFDM signalling symbol and a second OFDM signalling symbol, the first OFDM signalling symbol comprising a set of data symbols indicative of physical layer characteristics of data transmissions from the OFDM transmitter allocated to subcarriers of the first OFDM signalling symbol, the second OFDM signalling symbol comprising the set of data symbols allocated to subcarriers of the second OFDM signalling symbol, the allocation of the set of data symbols to subcarriers being different for the first OFDM signalling symbol and the second OFDM signalling symbol; and means for receiving the set of data symbols by combining the set of data symbols of the first OFDM signalling symbol and of the second OFDM signalling symbol.

The combining could be simple selection combining wherein e.g. the data is decoded from the appropriate subcarrier of either the first OFDM signalling symbol or the second OFDM signalling symbol depending on which subcarrier has the best signal to noise ratio.

The invention may allow an improved communication of physical layer characteristics data. An increased range may be obtained e.g. allowing improved cell coverage. In particular, frequency diversity may be exploited to allow transmission of signalling information over larger distances and/or with improved reliability. In particular, in many communication systems, an improved correspondence between the range provided by signalling information and by user data may be achieved. It will be appreciated that the features described with reference to the OFDM transmitter may equally be applied to the OFDM receiver.

According to an optional feature of the invention, the means for receiving is arranged to combine the set of data symbols of the first OFDM signalling symbol and of the second OFDM signalling symbol by Maximum Ratio Combining. This may improve performance.

According to an optional feature of the invention, the OFDM receiver further comprises means for detecting an indication of the presence of the second OFDM signalling symbol in the first OFDM signalling symbol; and wherein the means for receiving is arranged to receive the set of data symbols in response to the detection. In particular, the means for receiving may be arranged to receive the first set of data symbols without consideration of the second OFDM signalling symbol if no indication of the presence of the second OFDM signalling symbol is detected in the first OFDM signalling symbol.

This may allow an efficient performance and/or may improve backwards compatibility and/or may facilitate communication in communication systems employing receivers and/or transmitters with differing capabilities.

According to a third aspect of the invention, there is provided a method of Orthogonal Frequency Division Multiplexing, OFDM, transmission from an OFDM transmitter comprising: generating a set of data symbols indicative of physical layer characteristics of data transmissions from the OFDM transmitter; generating a first OFDM signalling symbol by allocating the set of data symbols to subcarriers of the first OFDM signalling symbol; generating a second OFDM signalling symbol by allocating the set of data symbols to subcarriers of the second OFDM signalling symbol, the allocation of the set of data symbols to subcarriers being different for the first OFDM signalling symbol and the second OFDM signalling symbol; and transmitting a message comprising the first OFDM signalling symbol and the second OFDM signalling symbol.

According to a fourth aspect of the invention, there is provided a method of receiving Orthogonal Frequency Division Multiplexing, OFDM, transmissions from an OFDM transmitter comprising: receiving a message comprising a first OFDM signalling symbol and a second OFDM signalling symbol, the first OFDM signalling symbol comprising a set of data symbols indicative of physical layer characteristics of data transmissions from the OFDM transmitter allocated to subcarriers of the first OFDM signalling symbol, the second OFDM signalling symbol comprising the set of data symbols allocated to subcarriers of the second OFDM signalling symbol, the allocation of the set of data symbols to subcarriers being different for the first OFDM signalling symbol and the second OFDM signalling symbol; and receiving the set of data symbols by combining the set of data symbols of the first OFDM signalling symbol and of the second OFDM signalling symbol.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to the Technical Specifications and proposals for an IEEE 802.11 communication system and in particular an IEEE 802.11n communication system. However, it will be appreciated that the invention is not limited to this application but may be applied to many other OFDM communication systems including for example other IEEE 802.11 communication systems.

Figure 1:
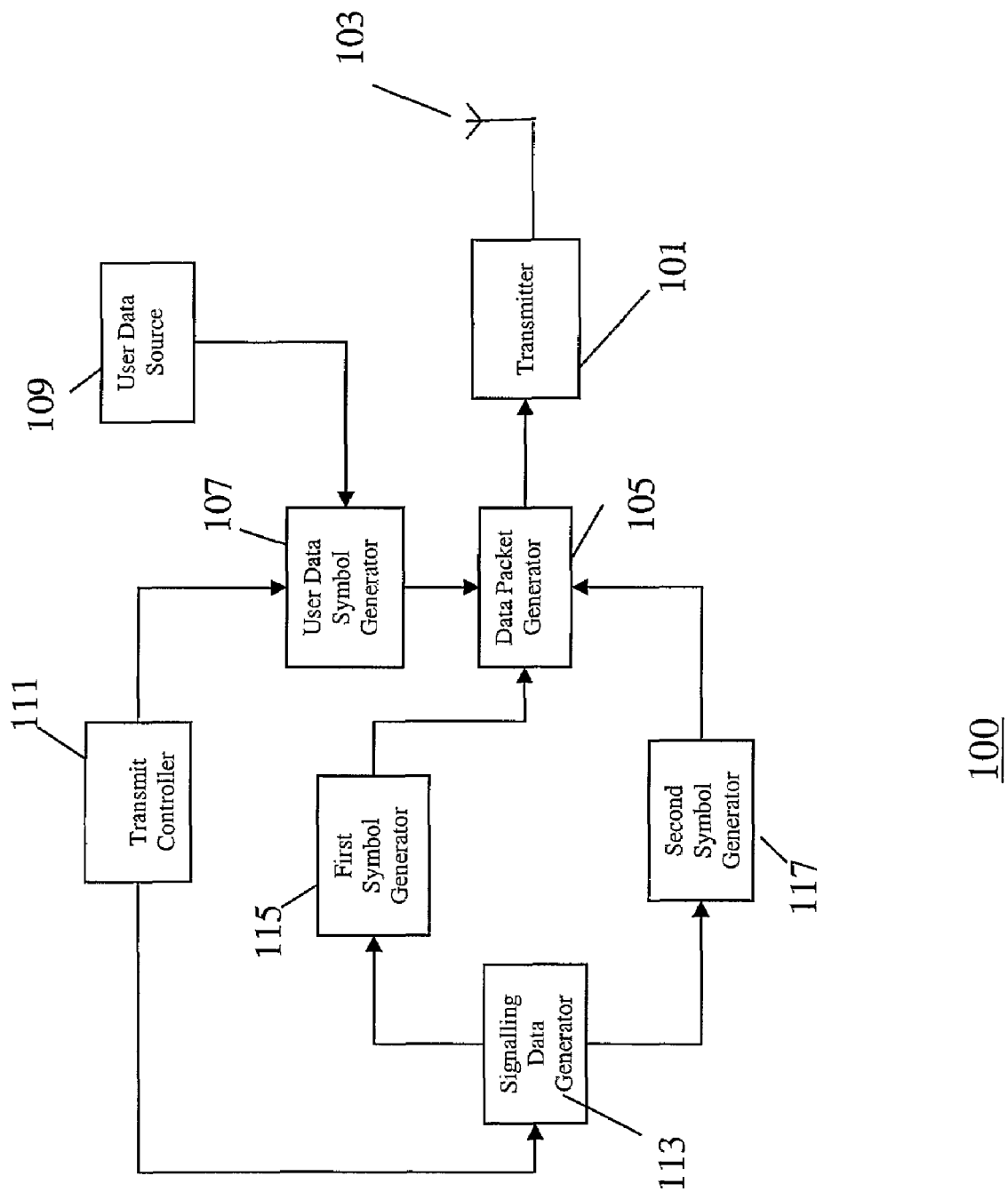
FIG. 1 illustrates an Orthogonal Frequency Division Multiplexing, OFDM, transmitter in accordance with some embodiments of the invention.

FIG. 1 illustrates an Orthogonal Frequency Division Multiplexing, OFDM, transmitter 100 in accordance with some embodiments of the invention.

The OFDM transmitter 100 comprises a transmitter 101 which is arranged to transmit OFDM signals in accordance with the Technical Specifications for the communication system. In the specific example, the OFDM transmitter 100 is an IEEE 802.11 transmitter which is coupled to an antenna 103.

The transmitter 101 is further coupled to a data packet generator 105 which generates data packets that are fed to the transmitter 101 for transmission. Specifically, the data packet generator 105 generates a data packet comprising a number of signalling OFDM symbols and a number of user data symbols.

The data packet generator 105 is coupled to a user data symbol generator 107 which is further coupled to a user data source 109. In the specific example, the user data source 109 is an internal source but it will be appreciated that data to be transmitted may be received from any physical, logical or functional external or internal entity.

The user data symbol generator 107 is further coupled to a transmit controller 111 which controls the transmission characteristics of the transmitted signals. In particular, in accordance with the IEEE 802.11 specifications, different characteristics and modes may be used for transmission. Specifically, different forward error correcting schemes, modulation schemes and transmission modes may be used for transmission of data packets and the transmit controller 111 is arranged to select the desired parameters and feed these to the user data symbol generator 107.

In response, the user data symbol generator 107 applies the selected error coding and modulation scheme to the user data received from the user data source 109 to generate an OFDM symbol. Specifically the user data symbol generator 107 encodes the data from the user data source and selects the appropriate data symbol by selecting the appropriate constellation point from the specified constellation for each subcarrier of the OFDM symbol. For example, in some modes the user data symbol generator 107 may apply a ½ rate convolutional encoding and generate a QPSK symbol for each subcarrier whereas in other more robust modes, the user data symbol generator 107 may apply a ½ rate convolutional encoding and generate a BPSK symbol for each subcarrier.

The transmit controller is furthermore coupled to a signalling data generator 113. The signalling data generator 113 generates a set of data symbols which are indicative of physical layer characteristics of data transmissions from the OFDM transmitter 100. In particular, the signalling data generator 113 generates a set of data symbols which define the transmit parameters and characteristics that have been applied to the user data by the user data symbol generator 107. Thus, the set of data symbols may identify the forward error correcting coding and symbol constellations used and may further include information of other transmission parameters affecting physical layer communication such as e.g. the duration of the data packets.

In the specific example, the signalling data generator 113 generates a SIG or SIG-N field in accordance with the specifications for IEEE 802.11 communication systems.

It will be appreciated that the Physical Layer is the lowest layer of the seven layer Open Systems Interconnection (OSI) or similar network models. The physical layer provides the means to activate and use a physical connection, in this case the radio communication link, for bit transmission. In other words, the physical layer provides the procedures for transferring individual bits across a physical media.

The signalling data generator 113 is coupled to a first symbol generator 115 and a second symbol generator 117 which are both fed the set of data symbols from the signalling data generator 113. In the example of FIG. 1, the signalling data generator 113 generates the set of data symbols as QPSK symbols ready for transmission in individual OFDM subcarriers.

The first symbol generator 115 generates a first OFDM signalling symbol by allocating the received data symbols to subcarriers of the first OFDM signalling symbol. Specifically, the first symbol generator 115 may simply select a subcarrier for each data symbol of the set of data symbols in accordance with a predetermined rule or table. For example, a single data symbol may be used to identify the forward error coding rate applied, and it may be predefined that this symbol is transmitted in, say, subcarrier number N.

Similarly, the second symbol generator 117 generates a second OFDM signalling symbol by allocating the received data symbols to subcarriers of the second OFDM signalling symbol. Likewise, the second symbol generator 117 may simply select a subcarrier for each data symbol of the set of data symbols in accordance with a predetermined rule or table. However, the allocation of data symbols is different for the first symbol generator 115 and the second symbol generator 117 resulting in at least some of the data symbols of the set of data symbols being allocated to different subcarriers in the first and the second OFDM signalling symbol.

The first symbol generator 115 and the second symbol generator 117 are further coupled to the data packet generator 105 which is fed the first and second OFDM symbols. The data packet generator 105 then proceeds to generate a data packet comprising the first and second OFDM symbols as well as the user data OFDM symbols received from the user data symbol generator 107. In the specific example of an IEEE 802.11 transmitter, the data packet generator 105 furthermore inserts a preamble of known data to facilitate reception and in particular to facilitate initial gain setting, synchronisation and channel estimation by the receiver.

The generated data packet is fed to the transmitter 101 which proceeds to transmit the OFDM symbols. In particular the transmitter 101 performs an inverse Discrete Fourier Transform (iDFT) on the OFDM symbols, upconverts and amplifies the resulting signal etc as will be well known to the person skilled in the art.

Thus, in the transmitter of FIG. 1, the physical layer signalling data symbols are transmitted twice using different OFDM signalling symbols. Furthermore, the allocation of data to the different subcarriers is varied between the two different signalling symbols thereby obtaining a reliability improvement which exceeds the 3 dB gain which is achievable by conventional retransmission. Specifically, the approach may allow for data packets to be transmitted where the effective range for the signalling information is extended substantially. In particular, in frequency selective fast fading channels, which are typical for many applications of IEEE 802.11 systems, a significant improvement of typically 30 to 35% can be achieved Specifically, the described transmitter may provide for an improved transmission of a SIG-N field providing a longer range than the range of the IEEE 802.11 robust modes for transmission of user data. Thus, the transmitter may allow for the coverage to be limited by the range of the user data transmissions rather than the range of the signaling information included in the data packets. This may significantly increase the coverage of IEEE 802.11 cells and may improve the reliability of the communications.

It will be appreciated that any suitable mechanism, algorithm or criterion for allocating data symbols to subcarriers may be used as long as the allocation is not identical for the first and second OFDM signalling symbols.

In some embodiments, the first and/or second OFDM signalling symbol may further comprise an indication of the allocation of data to the different subcarriers. This may be used by a receiver in decoding the received data.

In some embodiments, the allocations may be based on e.g. priori channel knowledge information. For example, e. in a closed loop scenario the allocations may be continuously be adapted to the current conditions. Alternatively or additionally, the receiver may feed back information which can be used to modify an allocation of data to subcarriers.

In the specific example of FIG. 1, the first symbol generator 115 allocates a first subset of the data symbols to a first subset of subcarriers of the first OFDM signalling symbol whereas the second symbol generator 117 allocates the same data symbols to a different subset of subcarriers. Furthermore, a low complexity implementation may be achieved by the second symbol generator 117 allocating the data symbols to subcarriers which have a predetermined offset with respect to the allocation by the first symbol generator 115.

For example, if the first subset comprises ten data symbols, the first symbol generator 115 may allocate these to subcarriers N, N+1, N+2 . . . N+9 whereas the second symbol generator 117 may allocate the same data symbols to subcarriers M, M+1, M+2 . . . M+9 where M is different from N. Preferably, the two subsets of subcarriers are non-overlapping i.e. the difference between N and M is larger than ten. Indeed, in order to increase the frequency diversity it may be advantageous in many embodiments to separate the same data symbol as far as possible in the frequency domain and the difference between N and M may thus be increased as much as possible in consideration of other design parameters and criteria.

Furthermore, the first symbol generator 115 may also be arranged to allocate a second subset of the set of data symbols to the second subset of subcarriers of the first OFDM signalling symbol and the second symbol generator 117 may allocate the second subset of the data symbols to the first subset of carriers. Thus, the first and second subsets of data symbols of the SIG-N field by simply swap subcarriers between the two OFDM signalling symbols.

Figure 2:
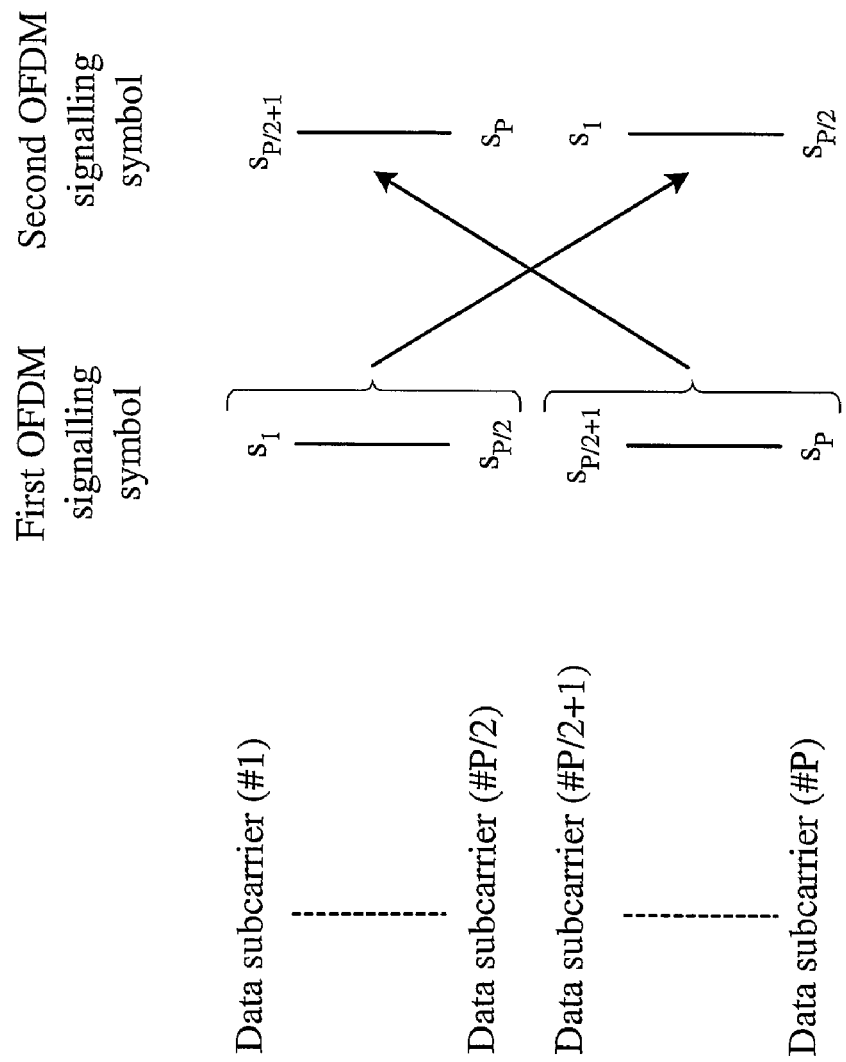
FIG. 2 illustrates an example of data symbol allocation to OFDM signalling symbols in accordance with some embodiments of the invention.

FIG. 2 illustrates a specific example of data symbol allocation to OFDM signalling symbols in accordance with some embodiments of the invention.

In the example, a number P of subcarriers are used in each OFDM symbol and all available subcarriers of the OFDM signaling symbols are used for transmitting the SIG-N field. In accordance with proposals for the IEEE 802.11 technical specifications P=54 in a 20 MHz bandwidth and P=108 in a 40 MHz bandwidth.

In the example, the data symbols that are successively sent on the first P/2 data subcarriers for the first OFDM signaling symbol are allocated to the data subcarriers #P/2+1 to #P/2 for the second OFDM signaling symbol. Similarly the symbols that are transmitted on the data subcarriers #P/2+1 to #P for the first OFDM signaling symbol are transmitted on the first P/2 data subcarriers for the second OFDM signaling symbol.

Figure 3:
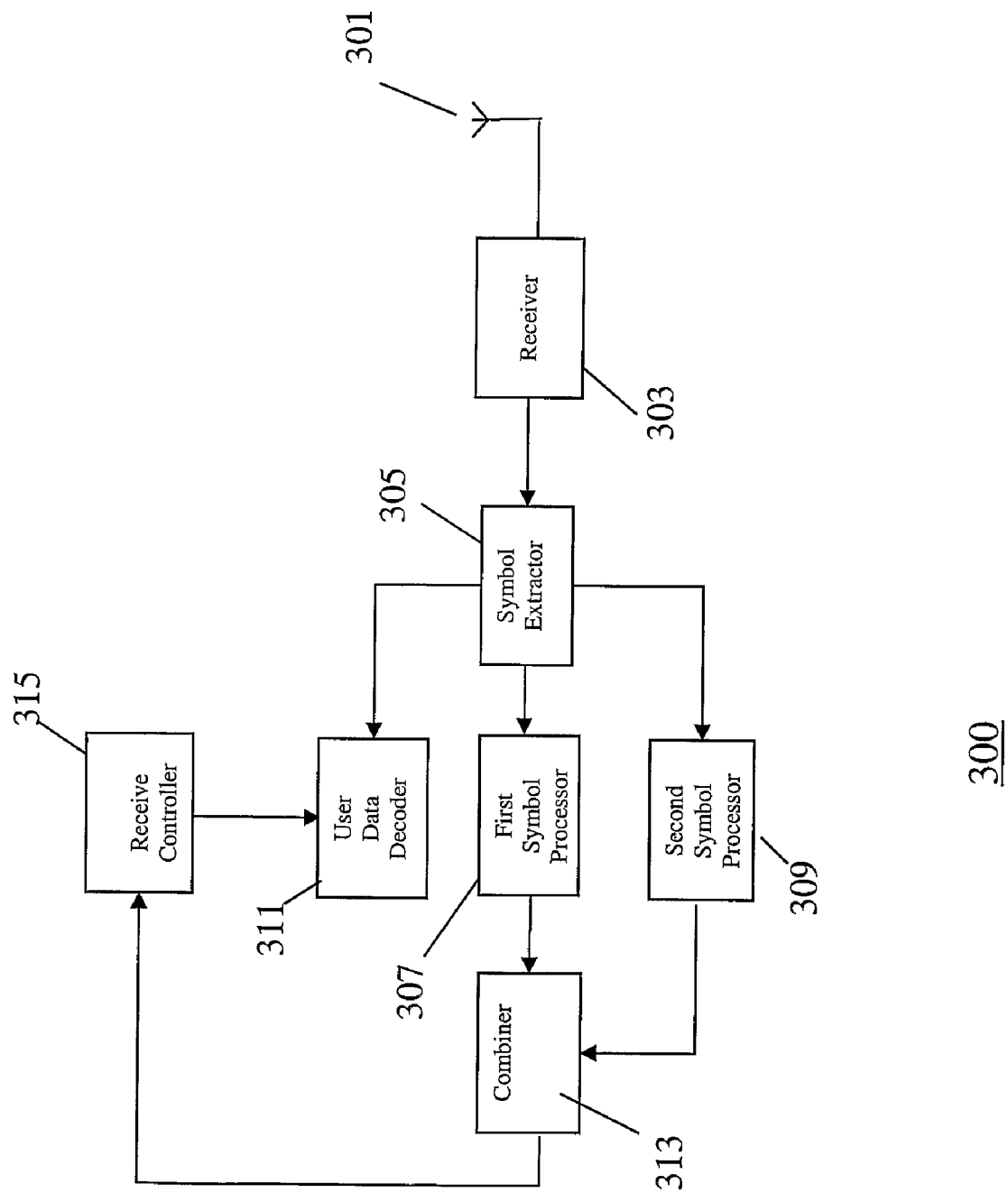
FIG. 3 illustrates an OFDM receiver in accordance with some embodiments of the invention.

FIG. 3 illustrates an OFDM receiver 300 in accordance with some embodiments of the invention.

The OFDM receiver 300 comprises an antenna 301 connected to a receiver 303 which receives the signal from the OFDM transmitter 100 of FIG. 1. The receiver 303 demodulates, amplifies, down-converts and generates the OFDM symbols by applying a Discrete Fourier Transform (DFT) as will be known to the person skilled in the art.

The receiver 303 is coupled to a symbol extractor 305 which is further coupled to a first symbol processor 307, a second symbol processor 309 and a user data decoder 311. The symbol extractor 305 extracts the different OFDM symbols from the data packet and specifically forwards the first OFDM signaling symbol to the first symbol processor 307 and the second OFDM signaling symbol to the second symbol processor 309. In addition, the user data OFDM symbols are fed to the user data decoder 311.

The first symbol processor 307 processes the first OFDM signaling symbol and/or the second symbol processor 309 processes the second OFDM signaling symbol such that the corresponding data symbols of the first set of data symbols align in the two OFDM symbols. For example, the second symbol processor 309 may simply reorder the data of the second OFDM signaling symbol such that it is the same as the first OFDM signaling symbol.

The first symbol processor 307 and second symbol processor 309 are coupled to a combiner 313 which combines the data of the first and second OFDM signaling symbols.

In a simple embodiment, the combiner 313 simply performs a selection combining wherein the combiner 313 for each subcarrier selects the data symbol value of either the first or the second OFDM signaling symbol. The combiner may for example select the data symbol having the highest received signal value.

In other embodiments, more advanced combining may be applied and in particular Maximum Ratio Combining wherein each data value is weighted in accordance with a quality measure (such as a signal to noise ratio) before being added together to generate a combined data value.

The combiner 313 is coupled to a receive controller 315 which is fed the combined data values. Thus, in the specific example, the receive controller 315 receives the SIG-N field which reflects the transmission parameters used by the OFDM transmitter 100 for transmitting the user data.

The receive controller 315 is coupled to the user data decoder 311 and feeds the information of the applied physical layer transmission parameters to this. In response, the user data decoder 311 decodes the received OFDM user data symbols. For example, the user data decoder 311 proceeds to apply the appropriate forward error correcting decoding scheme and to decode the resulting data according to the symbol constellations defined by the SIG-N field.

In the above described examples, a single transmit and receive antenna was used for the communication. However, in e.g. IEEE 802.11n applications a plurality of transmit and/or receive antennas may be used.

Figure 4:
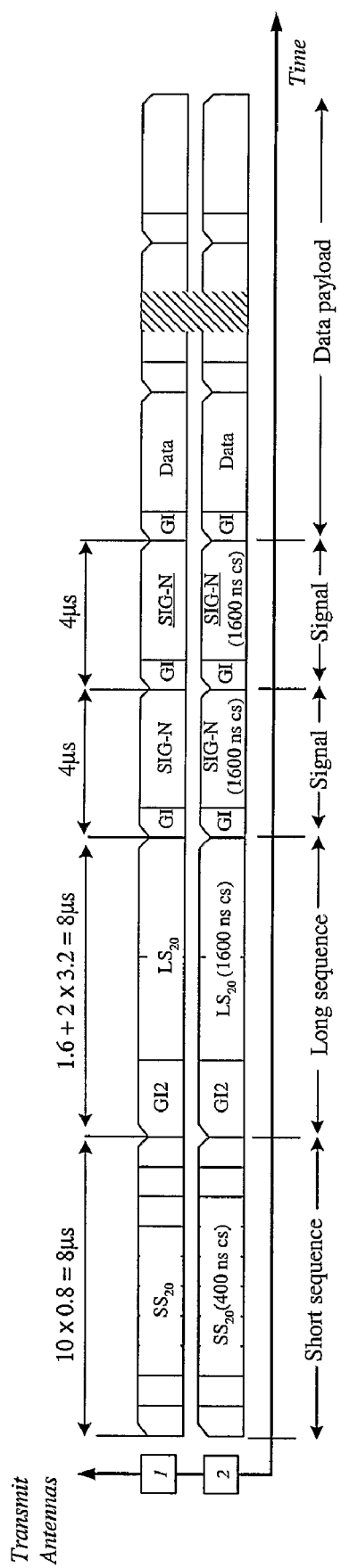
FIG. 4 illustrates an example of a data packet structure for transmissions in an IEEE 802.11n system in accordance with some embodiments of the invention.
Figure 5:
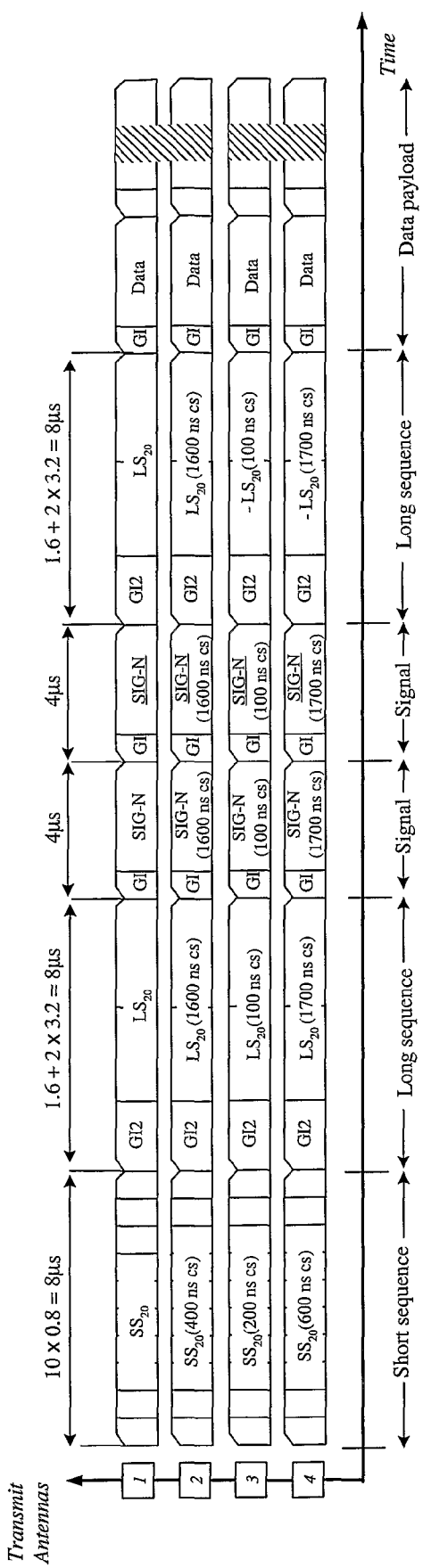
FIG. 5 illustrates an example of a data packet structure for transmissions in an IEEE 802.11n system in accordance with some embodiments of the invention.

Specifically, the SIG-N OFDM data symbols may be transmitted over the plurality of transmit antennas and may in particular use a Cyclic Delay Diversity (CDD) scheme. FIGS. 4 and 5 illustrate examples of a data packet structure for transmissions in accordance with some exemplary embodiments of the invention applied in IEEE 802.11n systems. FIG. 4 illustrates an example where two transmit antennas are employed and FIG. 5 illustrates an example where four transmit antennas are employed.

In some embodiments, the first OFDM signaling symbol may furthermore comprise an indication of whether the data packet comprises the second OFDM signaling symbol. Thus, in an IEEE 802.11n communication system some data packets may be transmitted with two OFDM signalling symbols whereas other data packets are transmitted using only one OFDM signalling symbol. The OFDM receivers in such a system may evaluate the first OFDM signalling symbol and evaluate if it comprises an indication of the presence of the second OFDM signalling symbol. If not, the receiver may proceed to determine the SIG-N data based on the first OFDM signalling symbol only and otherwise it may proceed to combine the signals from the two OFDM symbols. This approach may allow a simple detection to determine whether the SIG-N field is transmitted in one or two OFDM symbols.

The described embodiments may provide substantial benefits over conventional approaches. In particular, they may allow for an improved communication of SIG-N fields in an IEEE 802.11 communication system and may allow an increased range of communications and thus an improved coverage.

Figure 6:
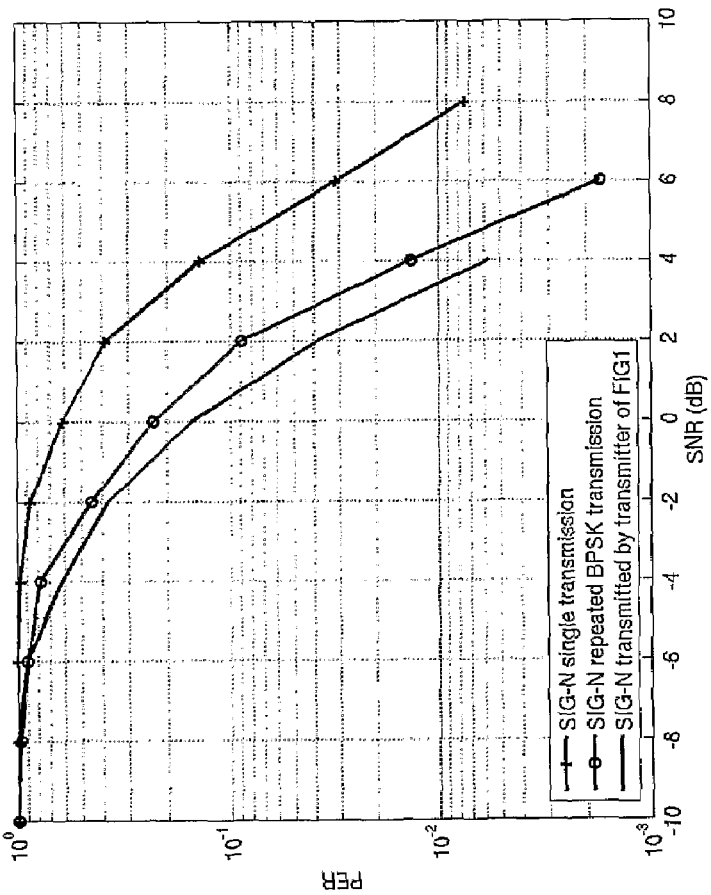
FIG. 6 illustrates simulation results for the error performance for an OFDM system in accordance with the described embodiments.

FIG. 6 illustrates simulation results for the error performance for an OFDM system in accordance with the described embodiments. The performance is compared to a conventional transmission of a single SIG-N field and to a system in accordance with current proposals for transmitting the SIG-N field in two OFDM symbols using BPSK modulation. The simulations have been performed for a channel model D according to the IEEE 802.11 specifications. As shown, an improvement of approximately 1 dB is achieved which translates into an increase of the coverage area of around 7% in comparison to the repeated transmission of the SIG-N field and a 4 dB (corresponding to a coverage increase of 30%) improvement in comparison to a single transmission of the SIG-N field.

It will be appreciated that although the previous description has focused on embodiments wherein two OFDM signaling symbols comprising the set of data symbols are transmitted, the described concepts and principles apply equally to three or more OFDM signaling symbols being transmitted.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units.

As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality.

The invention claimed is:

1. An Orthogonal Frequency Division Multiplexing, OFDM, transmitter comprising:
   means for generating a set of data symbols indicative of physical layer characteristics of data transmissions from the OFDM transmitter;
   first symbol generating means for generating a first OFDM signalling symbol by allocating the set of data symbols to subcarriers of the first OFDM signalling symbol;
   second symbol generating means for generating a second OFDM signalling symbol by allocating the set of data symbols to subcarriers of the second OFDM signalling symbol, the allocation of the set of data symbols to subcarriers being different for the first OFDM signalling symbol and the second OFDM signalling symbol; and
   transmitter means for transmitting a message comprising the first OFDM signalling symbol and the second OFDM signalling symbol;
   wherein the first symbol generating means are arranged to allocate a first subset of the set of data symbols to a first subset of subcarriers of the first OFDM signalling symbol and the second symbol generating means are arranged to allocate the first subset of the set of data symbols to a second subset of subcarriers;
   wherein the second symbol generating means are arranged to allocate the first subset of data symbols to subcarriers having a predetermined offset relative to the first subset of carriers;
   wherein the second symbol generating means are arranged to allocate data symbols to subcarriers such that a data symbol of the first subset of data symbols allocated to subcarrier number n by the first symbol generating means is allocated to subcarrier number n+N, where N is a predetermined non-zero integer.

2. The OFDM transmitter of claim 1 wherein the first symbol generating means arranged to allocate a second subset of the set of data symbols to the second subset of subcarriers of the first OFDM signalling symbol and the second symbol generating means are arranged to allocate the second subset of the set of data symbols to the first subset of carriers.

3. The OFDM transmitter of claim 2 wherein the first and second subset of subcarriers are non-overlapping.

4. The OFDM transmitter of claim 1 wherein the first symbol generating means are arranged to include an indication of the presence of the second OFDM signalling symbol in the first OFDM signalling symbol.

5. The OFDM transmitter of claim 1 wherein the message comprises OFDM user data symbols and the set of data symbols are indicative of physical layer transmit characteristics for the OFDM user data symbols.

6. The OFDM transmitter of claim 1 wherein the transmitter means are arranged to transmit the message on a plurality of transmit antennas.

7. The OFDM transmitter of claim 1 wherein the first symbol generating means are arranged to include an indication of the allocation of data symbols to subcarriers in the first OFDM signalling symbol.

8. The OFDM transmitter of claim 1 wherein the OFDM transmitter is an Institute of Electrical and Electronics Engineers, IEEE, 802.11 transmitter.

9. A method of Orthogonal Frequency Division Multiplexing, OFDM, transmission from an OFDM transmitter, the method comprising:
   generating a set of data symbols indicative of physical layer characteristics of data transmissions from the OFDM transmitter;
   generating a first OFDM signalling symbol by allocating the set of data symbols to subcarriers of the first OFDM signalling symbol;
   generating a second OFDM signalling symbol by allocating the set of data symbols to subcarriers of the second OFDM signalling symbol, the allocation of the set of data symbols to subcarriers being different for the first OFDM signalling symbol and the second OFDM signalling symbol; and
   transmitting a message comprising the first OFDM signalling symbol and the second OFDM signalling symbol;
   wherein generating the first OFDM signaling symbol comprises allocating a first subset of the set of data symbols to a first subset of subcarriers of the first OFDM signalling symbol and wherein generating the second OFDM signalling symbol comprises allocating the first subset of the set of data symbols to a second subset of subcarriers;
   wherein generating the second OFDM signalling symbol comprises allocating the first subset of data symbols to subcarriers having a predetermined offset relative to the first subset of carriers;
   wherein generating the second OFDM signalling symbol comprises allocating data symbols to subcarriers such that a data symbol of the first subset of data symbols allocated to subcarrier number n by the first symbol generating means is allocated to subcarrier number n+N, where N is a predetermined non-zero integer.

* * * * *